Dec. 15, 1953  A. G. TALBERT  2,662,780
STABILIZER FOR SPRING-SUPPORTED BODIES
Filed Sept. 2, 1950  2 Sheets-Sheet 1
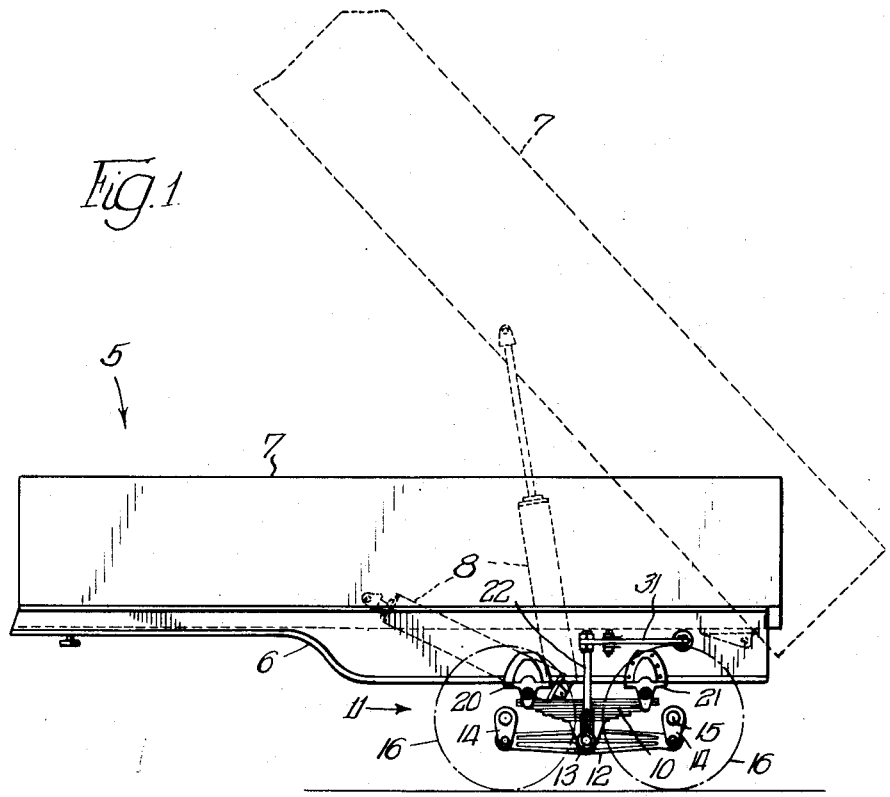
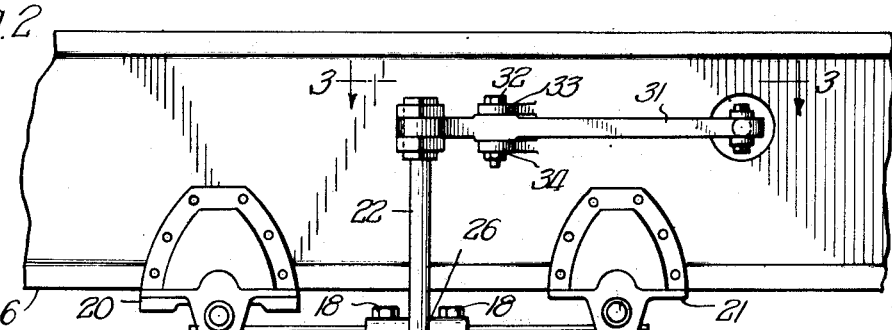
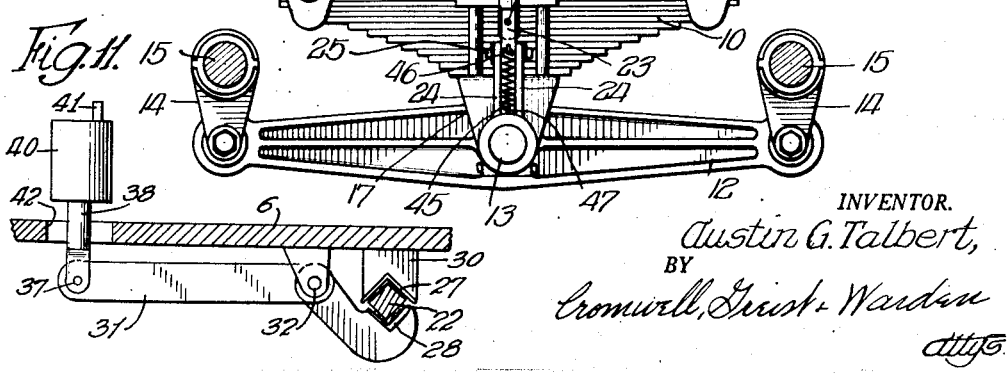
INVENTOR.
Austin G. Talbert,
BY
Cromwell, Greist + Warden
attys.

Dec. 15, 1953  A. G. TALBERT  2,662,780
STABILIZER FOR SPRING-SUPPORTED BODIES
Filed Sept. 2, 1950  2 Sheets-Sheet 2
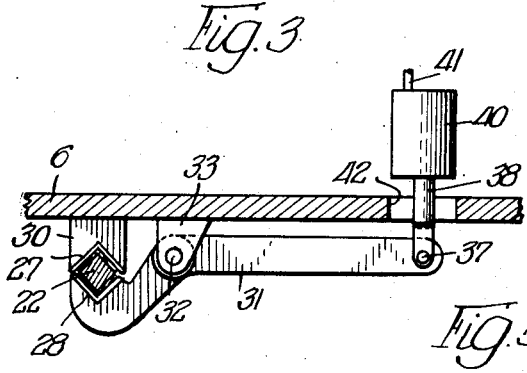
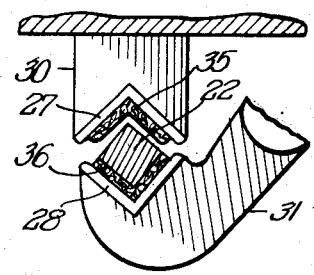
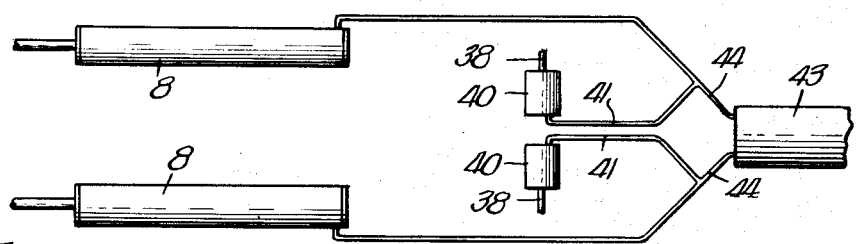
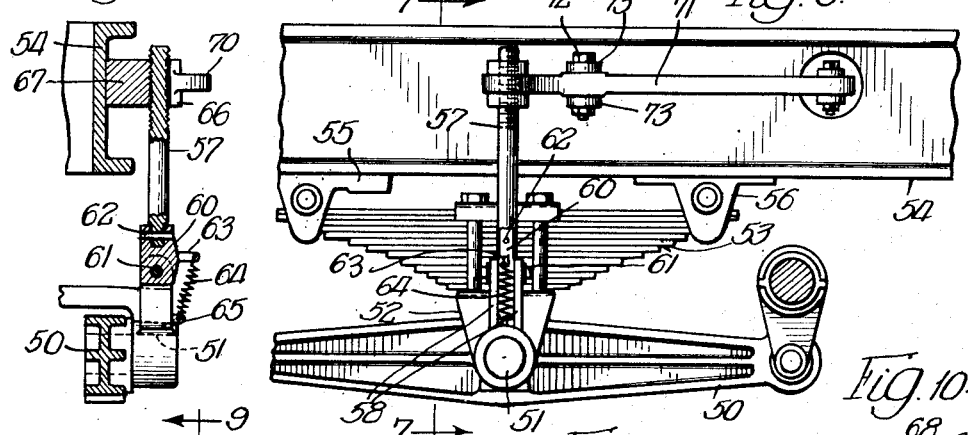
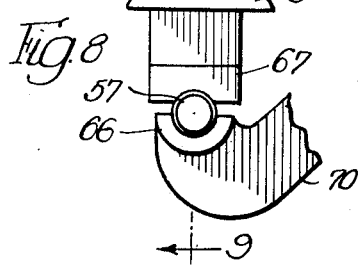
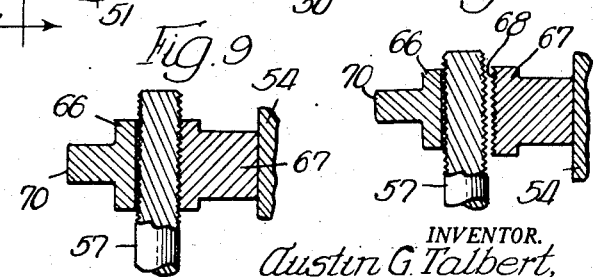
INVENTOR.
Austin G. Talbert,
BY
Cromwell, Grist & Warden
Attys.

Patented Dec. 15, 1953

2,662,780

UNITED STATES PATENT OFFICE 2,662,780

STABILIZER FOR SPRING-SUPPORTED BODIES

Austin G. Talbert, Lyons, Ill., assignor to Talbert Construction Equipment Company, Lyons, Ill., a corporation of Illinois Application September 2, 1950, Serial No. 183,040

10 Claims. (Cl. 280—104.5)

The present invention relates to certain new and useful improvements and innovations in stabilizer mechanisms which can be used to temporarily lock out the springs, and provide a rigid connection between the bodies and chassis, of heavy duty trucks and trailers.

Heretofore, several different stabilizer mechanisms have been proposed for use on trucks for the purpose of rigidly locking the spring-supported truck bodies to the respective chassis. In so far as I am aware none of these previously proposed constructions have proven sufficiently satisfactory to go into practical usage on a commercial scale.

The stabilizing or body locking mechanism of the present invention is particularly suited for application to heavy duty truck and semi-trailers of the type utilized for transporting heavy loads cross country. The invention is particularly suited for use in connection with heavy duty dump trailers and low-bed trailers.

Occasions arise frequently wherein there is a need to lock or rigidly connect the spring-supported bodies of dump trailers and low-bed trailers, directly to the chassis or supporting wheel unit so as temporarily to cancel out the spring-support. For example, when the body of a dump trailer is raised or elevated for the purpose of discharging a heavy load therefrom, the body is in a relatively unstable condition because the center of gravity is located well above the supporting chassis and the supporting springs allow the raised body to sway from side-to-side. This condition is particularly hazardous when the dump trailer is located on uneven ground where one of the sides is higher than the other. Under such conditions only very little disturbance may be required to cause the dump trailer to overturn. If such a dump trailer were provided with the stabilizer or locking mechanism of the present invention the elevated body could be rigidly or directly connected with the chassis, thereby in effect canceling out the spring suspension, and making the elevated body much more stable against overturning.

The stabilizer or locking mechanism serves important uses other than that of rigidifying or stabilizing a spring-supported body on the chassis so as to prevent overturning or undesired swaying. Another use is illustrated in connection with a low-bed trailer of the type used for transporting heavy equipment, such as power shovels, and earth movers, cross country. The platforms of these low-bed trailers are purposely built low with a minimum or road clearance. There are instances in which an additional inch or so of ground clearance will permit the low-bed trailer to be transported across places where it could not otherwise be moved. For example, a railroad crossing having unusually steep approaches may prevent a loaded low-bed trailer from following a certain highway route because the bottom of he trailer platform will become hung up as it passes over the crossing. In many instances only an inch or so of additional clearance would be sufficient to permit the trailer to pass. A similar situation is sometimes encountered with stretches of road or highway which have an unusually high crown in the center.

The body stabilizer or locking mechanisms of the present invention can be used in connection with a low-bed trailer so as to lock and support the body in a raised position thereby providing the necessary additional ground clearance. In order to obtain this additional clearance the body of the low-bed trailer is jacked-up either loaded or empty, until the desired increase in height is obtained and then the stabilizing mechanism is locked.

Still another function of the stabilizer mechanism of the present invention is that of securing additional top clearance for high loads so that they will be able to pass under viaducts and bridges which could not otherwise be negotiated because of insufficient clearance. For example, if an additional inch or two of top clearance is required it may be practical to overload the vehicle until the body has been depressed the desired amount and then the locking mechanism is used to hold the body in the depressed position after the overload has been removed.

It will be understood that the trailers and trucks equipped with the locking or stabilizing mechanisms of the present invention are of the conventional type and the locking mechanisms are employed only temporarily as a need arises. Normally the truck or trailer bodies are spring-suspended in the usual manner. The mechanisms of the present invention will be used only when it is necessary or desirable to connect the spring-supported bodies rigidly to the frame or chassis so as to cancel out the flexible spring connection by which the bodies are normally supported. However, while the body stabilizer or locking mechanisms are normally only employed when the occasion arises, the frequency with which it is necessary to use this type of device is sufficiently often so that they will fill a very important need in connection with heavy duty type trucks and trailers.

The object of the present invention is a locking or stabilizer mechanism for a truck or trailer body which is spring-supported from a chassis, which mechanism is characterized by: its simplicity; ruggedness; low cost; ease of installation on conventional type vehicles; maximum effective locking or clamping area; ability to accommodate relative movement between a body and a chassis without damage when the mechanism is released with the supporting springs being compressed; and, freedom from play or vibration at all times.

Certain other objects of the invention will, in part, be obvious and will in part appear hereinafter.

For a more complete understanding of the nature and scope of the invention reference may now be had to the following detailed description thereof taken in connection with the accompanying drawings, wherein:

Fig. 1 is a side elevational view of a heavy duty type dump trailer equipped with a stabilizer or spring lock mechanism forming one embodiment of the invention, certain parts being shown diagrammatically and the dump body being shown in the raised position in broken line;

Fig. 2 is a fragmentary side elevational view on enlarged scale, showing the stabilizer mechanism of Fig. 1;

Fig. 3 is a horizontal sectional view taken on line 3—3 of Fig. 2;

Fig. 4 is a fragmentary sectional view on enlarged scale showing the clamping jaws of Fig. 3 in the open position;

Fig. 5 is a diagrammatic view of the hydraulic system provided on the dump trailer of Fig. 1 for elevating the dump body and incorporating therein the hydraulic cylinders for operating the stabilizer mechanisms on the opposite sides of the trailer body;

Fig. 6 is a fragmentary side elevational view corresponding to Fig. 2 showing a modified form of vehicle body stabilizer or locking mechanism;

Fig. 7 is a vertical sectional view taken on line 7—7 of Fig. 6;

Fig. 8 is a plan view of the modification as shown in Fig. 7;

Fig. 9 is a vertical sectional view taken on line 9—9 of Fig. 8;

Fig. 10 is a view corresponding to Fig. 9, but with the clamping jaws shown in the open or unlocked position; and Fig. 11 is a view corresponding to Fig. 3 but showing the stabilizer mechanism on the opposite side of the vehicle.

In Fig. 1 of the drawings, the dump trailer is indicated generally at 5 and comprises a body 6 having a dump box 7 which is elevatable by a pair of hydraulic hoists 8—8. The dump body 6 is supported on opposite sides by sets of leaf springs 10—10 from a chassis which is indicated generally at 11. The manner in which the dump body 6 is carried on the springs 10 and the latter are supported from the chassis as shown in greater detail in Fig. 2.

The chassis or tandem unit 11 is of the type which has an equalizing beam 12 on each side pivotally mounted at the center upon a main axle 13. Bearing fixtures 14—14 pivotally mounted on opposite ends of the equalizing beams 12 support the axles 15—15 which carry the wheels 16—16. Chassis of this type are known and the details thereof do not form a part of the present invention.

A saddle 17 is pivotally mounted on opposite ends of main axle 13 over the center of each equalizing beam 12. Each of the sets of springs 10 is supported on the top of one of the saddles 17 and is secured thereto by means of the shackle bolts 18—18. The front end of each spring unit 10 is pivotally fastened to the underside of the dump body 6 by means of a fixture 20 while the rear end of the spring unit is fastened to the underside by means of a fixture 21. It will be understood that the structure shown in Figs. 1 and 2 is duplicated on the opposite side of the dump trailer 5. The spring suspension arrangement shown in Figs. 1 and 2 is typical and illustrative of those commonly in use for supporting trucks and trailer bodies from chassis units.

The stabilizer or spring lock-up mechanism shown in Figs. 1–4 includes a connecting rod 22 of square cross section adjacent the upper end, and the bottom end of which is secured to the saddle 17 by means of a universal joint so that the connecting rod is free to swing in all directions. The universal joint includes a segment 23 pivotally mounted adjacent its bottom end between spaced upstanding ears 24—24 by means of a connecting pin 25. The ears 24 may be welded or otherwise secured to the saddle 17 when this element is not originally provided with them. The universal joint member 23 is free to swing in a vertical plane toward and away from the dump body 6 and the bottom end of the connecting rod 22 is pivotally attached to the upper end of the element 23 by means of a pin 26 whereby the connecting rod 22 is also swingable in a vertical plane which extends parallel to the side of the dump body 6.

Adjacent its upper end the connecting rod 22 extends between a set or pair of clamping jaws consisting of a stationary clamping jaw 27 and a movable clamping jaw 28. The stationary clamping jaw 27 is secured on the side of the dump body 6 by means of a bracket 30 which may be either bolted or welded thereto. The movable clamping jaw 28 is carried on the shorter arm of a bell crank lever 31 which is pivotally connected on the side of the dump body 6 by means of a bolt 32 which extends downwardly through top and bottom ears 33 and 34 and through a registering hole provided therefor in the bell crank lever 31. The ears 33 and 34 may be individually welded to the sides of the dump body 6 or they may form part of a single bracket which is itself welded or bolted to the dump body.

The clamping faces of the jaws 27 and 28 are V-shaped with the angle between the sides being preferably 90° so as to conform to the shape of the connecting rod 22. Each of the faces of the clamping jaws 27 and 28 are lined with a suitable material having a high coefficient of friction, such as brake lining. These linings are indicated in Figs. 3 and 4 at 35 and 36, respectively. The effectiveness of the clamping action can be increased by also providing the outside of the connecting rod 22 adjacent its upper end with brake lining so that when the clamping jaws are closed together the brake lining will be pressed against brake lining.

Referring to Figs. 3 and 11, it will be seen that the free end of the longer arm of each of the bell cranks 31 is pivotally connected by means of a pin 37 to the outer end of the adjacent piston rod 38 of a hydraulic cylinder unit 40, of known type. The cylinders 40 are supplied with hydraulic fluid under pressure, such as oil, from the pressure line 41. The cylinder units 40 for operating the stabilizer mechanisms on opposite sides of the dump trailer 5 will be located in between the side members of the dump body frame 6 and the piston rods 38 will extend through openings 42 provided therefor in the frame.

It is advantageous to have the stabilizer unit of the present invention operated in synchronism with the hoists 8 so that the stabilizer will be automatically locked whenever the dump box 7 is raised, and will automatically be released when it is lowered. One practical arrangement whereby this synchronous operation may be obtained is illustrated diagrammatically in Fig. 5. A master hydraulic cylinder is designated at 43, which may in practice be supplied with hydraulic fluid under pressure, such as oil, from a pump which is driven by the motor of the truck or tractor unit. Two pressure lines 44—44 are served by the master cylinder 43. Each of the pressure lines 44 serves one of the hydraulic cylinders 40 and one of the hydraulic hoists 8 on one side of the dump trailer 5. Accordingly, whenever the operator applies the hydraulic fluid so as to raise the dump box 7, hydraulic fluid will also be applied to the cylinder units 40—40 as well as to the hoist units 8—8. Thus, the stabilizer mechanisms will be locked by the closing of the movable clamping jaws 28 against the upper end of the connecting rod 22 which is squeezed against the stationary clamping jaws 27. When the pressure on the hoists 8 is released so that the dump box 7 may fall, the pressure is also released on the cylinders 40 so that the stabilizers are unlocked.

When a load is discharged from the raised dump body 7 this body would normally rise a distance corresponding to the amount which the supporting springs 10 have been depressed by the load. Since the dump body 6 is locked rigidly or directly to the chassis unit by the stabilizers during the unloading of the dump box 7 the body cannot rise, and there will be a tendency for the dump body 6 to spring up as the stabilizer mechanisms are released. The smooth surface of the brake lining elements 35 and 36 permit relative movement between the clamping jaws 27 and 28 and the connecting rod 22 so that the body may spring up when the clamping jaws are opened.

In order to obtain the greatest amount of clamping or locking action, the friction engaging areas of the connecting rod 22 and the faces of the clamping jaws 27 and 28 are arranged so that when the jaws are closed the clamping area extends at least about two-thirds of the way around the connecting rod 22. This arrangement also provides the additional feature that the clamping jaws, when open or separated, provide a guideway for the upper end of the connecting rod 22 so that it is maintained in between the clamping jaws at all times. However, if the connecting rods were not further secured, they would be free to shake and vibrate in between the faces of the respective clamping jaws 27 and 28 when the movable clamping jaws 28 are retracted, as shown, for example, in Fig. 4. Such play and vibration would be objectionable and it is overcome by employing a tension spring 45 which serves to hold the connecting rod 22 in contact with the clamping face of the jaw 28 at all times. The upper end of the tension spring 45 is hooked to a projection 46 which extends outwardly from the universal joint element 23 while the lower end of the spring 45 is connected to a lug 47 on the saddle 17. The tension springs 45 serve to hold the connecting rods 22 away from the sides of the dump body 6 and against the clamping faces of the movable clamping jaws 28 at all times, as shown in Fig. 4.

In Figs. 6 through 10 a modification of the stabilizer mechanism is shown which may be employed when there is little or no tendency for the spring-supported body to snap into a different position when the stabilizer mechanism is released. For example, the modification shown in Figs. 6 through 10 may be used to advantage on a low-bed semi-trailer of the type used for transporting heavy machinery and equipment.

In general, the modification shown in Figs. 6 through 10 has a construction which corresponds to that of the embodiment shown and described in connection with Figs. 1 through 5. Thus, the equalizing beams of the chassis unit are indicated at 50 and they support a main axle 51. The saddle fixtures are indicated at 52 and the leaf spring units are indicated generally at 53. The side frame member of the trailer body is indicated at 54, and the opposite ends of the spring units 50 are attached to the underside thereof by means of two sets of fixtures 55 and 56. Each connecting rod 57 is cylindrical in cross section and the upper end thereof is externally threaded as indicated. The bottom end of each connecting rod 57 is supported from a pair of spaced upstanding ears 58—58 by means of a universal type joint which includes an element 60 pivoted in between the upper ends of the ears 58 by means of the pin 61. The bottom end of each connecting rod 57 is pivotally connected to the upper end of the respective element 60 by means of the pin 62. Each universal joint element 60 carries a projection 63 (Fig. 7) which is provided with an eye at the outer end through which one end of a tension spring 64 may be connected while the other end is connected with a lug 65 carried by the saddle 52. Each spring 64 maintains the upper end of one of the connecting rods 57 at all times in contact with the concave space of the movable clamping jaw 66 on that side of the trailer. The concave surface of each movable jaw 66 is smooth so that relative movement between it and the threaded end of the connecting rod 57 is allowed. The stationary clamping jaw on each side of the body is indicated at 67 and it has a concave face which is provided with threads 68 (Fig. 10) which are adapted to intermesh with the threads on the upper end of the connecting rod 57 so as to maintain a maximum degree of interengagement. Each movable clamping jaw 66 is carried on the shorter arm 70 of a bell crank 71 pivoted for movement in a horizontal plane by means of a bolt 72 which projects downwardly through a pair of spaced apart ears 73—73 between which the bell crank 71 is supported.

When force is applied to the free end of each bell crank lever 71 so as to push the movable clamping jaw 66 inwardly toward the stationary clamping jaw 67, the connecting rod 57 therebetween is forced against the concave clamping face or area of the adjacent stationary clamping jaw 67 so that the threads on the rod and clamping jaw 67 intermesh and positively lock the connecting rod against relative movement. This arrangement permits a somewhat smaller force to be used to interlock the body to the chassis. However, if there is any tendency for the spring-supported body to snap to a free position when the stabilizer mechanism is released, the shifting of the stationary clamping jaw relative to the threads on the connecting rod 57 will soon cause the interengaging threads to be stripped.

In addition to the modifications shown and described, those skilled in the art will, in view of the disclosure, be able to make other modifications and changes without departing from the spirit and scope of the invention.

Having fully described the invention and set forth preferred embodiments thereof, what is claimed as new is:

1. In a vehicle of the class described having a body which is spring-supported from a chassis, the combination of rigid connecting rods on opposite sides of said vehicle, means pivotally connecting the bottom end of each connecting rod to said chassis so that said rod is swingable toward and away from said body in a vertical plane, a stationary clamping jaw mounted on each side of said body and located directly opposite the upper end of the adjacent connecting rod, a movable clamping jaw for each of said stationary jaws, means for pivotally mounting each of said movable clamping jaws on one side of said body so that it is swingable in a horizontal plane toward and away from its associated stationary jaw with the upper end of said connecting rod in between, and spring means attached to each of said connecting rods so as to urge the upper end thereof away from the adjacent stationary jaw and against said movable jaw, each of said connecting rods being slidable up and down against the faces of said respective movable clamp jaws when the latter are open and each rod being clamped against up and down movement between said movable and stationary jaws when the movable jaws are closed.

2. The combination called for in claim 1 wherein each of said spring means for holding each of said connecting rods against the adjacent movable clamping jaw consists of a coil tension spring one end of which is connected to said connecting rod and the other end of said spring being fastened to said chassis.

3. The combination called for in claim 1 wherein each of said clamping faces of said movable and stationary clamping jaws is provided by brake lining.

4. The combination called for in claim 1 wherein the upper end of each of said connecting rods has external threads and the clamping face of each of said stationary jaw has complementary threads therein.

5. The combination called for in claim 1 wherein each of said stationary and movable clamping jaws has a generally V-shaped clamping face, and the opposite sides of the upper ends of said connecting rods have V-shapes which complement those of said clamping jaw faces.

6. The combination called for in claim 1 wherein when each pair of said stationary and movable clamping jaws are closed on the upper end of a connecting rod, the combined clamping areas extend over two-thirds around the circumference of said connecting rod.

7. In a vehicle of the class described, in combination, a chassis having trailing pairs of wheels on opposite sides interconnected by equalizing beams which at their mid-points support the opposite ends of a main axle, a saddle pivotally mounted on each end of said main axle and straddling the middle of the adjacent equalizing beam, a set of leaf springs mounted on each of said saddles and extending parallel to the length of said vehicle, a body supported on said sets of springs, means fastening said body to said springs, and a stabilizer mechanism on each side of said body comprising, a connecting rod, universal joint means for pivotally connecting the bottom end of said connecting rod onto one of said saddles whereby the upper end of said rod is swingable in all directions, a stationary clamping jaw mounted on the adjacent side of said body and directly over said saddle, a movable clamping jaw, and means for pivotally mounting said movable clamping jaw on the side of said body so that it is swingable in a horizontal plane toward and away from said stationary clamping jaw with the upper end of the adjacent connecting rod located in between.

8. The structure called for in claim 7 wherein said stabilizer mechanism also comprises a tension spring one end of which is attached to the bottom end of said connecting rod and the other end of which is fastened to said saddle so as to hold and maintain the upper end of the connecting rod in contact against said movable clamping jaw.

9. The structure called for in claim 7 wherein a pair of spaced ears project above each of said saddles and one element of each of said universal joint means is pivotally connected to the adjacent pair of said spaced ears.

10. In a vehicle of the class described having a body assembly which is spring mounted on a chassis assembly, stabilizer means for locking said body assembly to said chassis assembly, comprising, a stationary clamping jaw mounted on one of said assemblies, a rigid connecting rod, means pivotally connecting one end of said rod to the other one of said assemblies so that the free end of the rod is swingable against said clamping jaw, a movable clamping jaw for clamping said free end of the connecting rod against said stationary jaw, means for pivotally mounting said movable jaw, and power applying means operatively connected with said movable jaw for forcing it toward said stationary jaw with said free end of said connecting rod being clamped therebetween.

AUSTIN G. TALBERT.

References Cited in the file of this patent

UNITED STATES PATENTS

| Number | Name | Date |
|---|---|---|
| 850,460 | Battershall | Apr. 16, 1907 |
| 1,975,119 | Oates | Oct. 2, 1934 |
| 2,020,489 | Walker et al. | Nov. 12, 1935 |
| 2,400,803 | Barnhart | May 21, 1946 |